United States Patent [19]
Tyus

[11] Patent Number: 4,795,186
[45] Date of Patent: Jan. 3, 1989

[54] PORTABLE STORAGE APPARATUS

[76] Inventor: Ruby M. Tyus, 5871 Division St., San Diego, Calif. 92114

[21] Appl. No.: 74,710

[22] Filed: Jul. 17, 1987

[51] Int. Cl.⁴ .......................... B62B 3/08; B62B 3/02
[52] U.S. Cl. .................................. 280/651; 280/37; 280/47.35; 280/47.37 R
[58] Field of Search ............. 280/639, 37, 651, 47.34, 280/47.35, 47.37, 655, 652, 641, 47.18

[56] References Cited

U.S. PATENT DOCUMENTS

| | | | |
|---|---|---|---|
| 1,961,394 | 6/1934 | Rothe | 280/47.35 |
| 2,439,992 | 4/1948 | Simonian | 280/37 |
| 2,840,142 | 6/1958 | Sands | 280/47.18 |
| 3,130,444 | 4/1964 | Stollsteiner | 280/47.37 |
| 4,055,357 | 10/1977 | Sorocin | 280/641 |
| 4,354,689 | 10/1982 | Perego | 280/47.37 |

FOREIGN PATENT DOCUMENTS 965360 2/1950 France .
2111917 7/1983 United Kingdom .

Primary Examiner—David M. Mitchell
Assistant Examiner—Tamara L. Finlay
Attorney, Agent, or Firm—Richard C. Litman

[57] ABSTRACT

A portable, lightweight and convenient device used to move a variety of items from one place to another. The device consists of a base assembly having a closeable lid. The closeable lid itself acts as a further base, on its upper surface to support other items carried within an enclosure formed by pliable material sidepanels, a front planar surface and a rear planar surface. The rear planar surface has a plurality of individual pockets disposed thereon.

5 Claims, 2 Drawing Sheets

PORTABLE STORAGE APPARATUS

BACKGROUND OF THE INVENTION

Many people have the daily task of carrying books, or articles about with them. Sometimes, especially with students, this tasks of carrying books and supplies far exceeds what can reasonably being carried in a strap or briefcase.

For example, as students are in school, the weather outside changes from sunny to rain and students leaving school have no effective means of carrying rain coats, umbrellas or sweaters with them as they go from place to place.

Lockers in many schools pose problems of their own. The student must lock it, and hope that someone else doesn't break in to the locker. Theft aside, many schools are closing lockers and even removing them from the hallways to avoid even an implication that drugs are being bought or sold on school property. In these schools, the students have no effective means of carrying their books, papers, coats and supplies and certainly no coherent method of doing so.

Many business-people likewise have problems carrying work-related papers, supplies and even a change of shirt with them when they travel. For many, the option of using a briefcase or a small suitcase doesn't perform the needed tasks adequately. This because, for example, the business-person might want to work while traveling; the briefcase slides off the lap and is not intended to write on.

Further, neither the briefcase nor the small suitcase has any but the most perfunctionary pockets or slots to separate a variety of items. For the most part, the conventional method of carrying supplies, a change of shirt or a new tie means putting most of these items together without any effective method of organizing them or the work waiting to be done.

The present device is a portable, wheelable locker. This apparatus incorporates the advantages of a lockable briefcase in the base of the device, with larger storage divider areas or compartments in another part of the apparatus. The consumer need not lift the device as it has its own wheels, which greatly facilitates the movement of bulky or heavier items such as large books.

Furthermore, the interior storage spaces provided along the rear surface of the apparatus constitute a very flexible storage area, which may be secured with a protective covering and drawn closed with a drawstring.

The advantages of such a lightweight, durable device made of aluminum framing, nylon or canvas or other such suitable materials is readily apparent: It offers a highly portable, secure method of carrying a variety of books, supplies or other items as may be necessary for the student, the business-person or other professional.

The device can also be folded when not in use and because of its lightweight, foldable construction can even be stored under the seats of airplanes or under desks, and the like. It is constructed for easy carrying.

SUMMARY OF THE PRIOR ART

The following U.S. Patents teach the disclose various types of carts, lockers and various support structures have been known, both patented and unpatented. The following cited references are found to be exemplary of the U.S. prior art. They are:

| U.S. Pat. No. | Inventor |
|---|---|
| 907,171 | W. W. Knight et al |
| 1,453,598 | L. T. Obele |
| 1,961,394 | P. A. Rothe |
| 1,970,267 | J. K. Bales |
| 3,630,387 | Wehner |
| 3,701,541 | Tarducci et al |
| 3,709,513 | Cassimally |

U.S. Pat. No. 1,970,267 to Bales discloses one of numerous sheet metal lockers. This particular locker is not designed to be portable or collapsible.

U.S. Pat. No. 3,701,541 to Tarducci et al discloses a folding bag to be used in shopping having collapsible wheels, and capable to be reduced to a handbag. This particular device comes closer to resembling the present device, but does not provide the variety of divided interior storage spaces nor the features of the present device.

U.S. Pat. Nos. 1,453,598 to Obele, 1,961,394 to Rotle, 3,630,387 to Wehner and 3,709,513 to Cassimally disclose portable racks and the such. Each invention contains at least one feature of the present device, but not all of the features in any one device or in any combination of these devices.

SUMMARY OF THE INVENTION

This invention relates to portable lockers and specifically relates to that category of portable locker that is used for the temporary and convenient storage of personal items while the user is traveling or temporarily away from home.

An object of this device is to provide a lightweight, sturdy construction to such a portable, wheeled locker such that the user may conveniently move such items as books, papers, lunches and bulky items such as a change of coats within the device. It is intended that the device may substitute for such other temporary storage devices as school lockers or briefcases or handbags.

Another objective is to provide the advantage of rolling a weight on wheels as a preferred method of moving weighty items, rather than carrying them outright. A further objective is to provide user a simple and convenient method of separating items by various categories such as valuables, which may be locked in the base of the device, and less valuable but bulky items such as coats which may be stored in the other storage compartments.

A still further objective of the present device is to provide a convenient, foldable locker for valuables that may be collapsed and placed in a relatively small space such as under an airline seat or under a desk and as such may be carried as the situation may require.

DESCRIPTION OF THE PREFERRED EMBODIMENT

Figure 1:
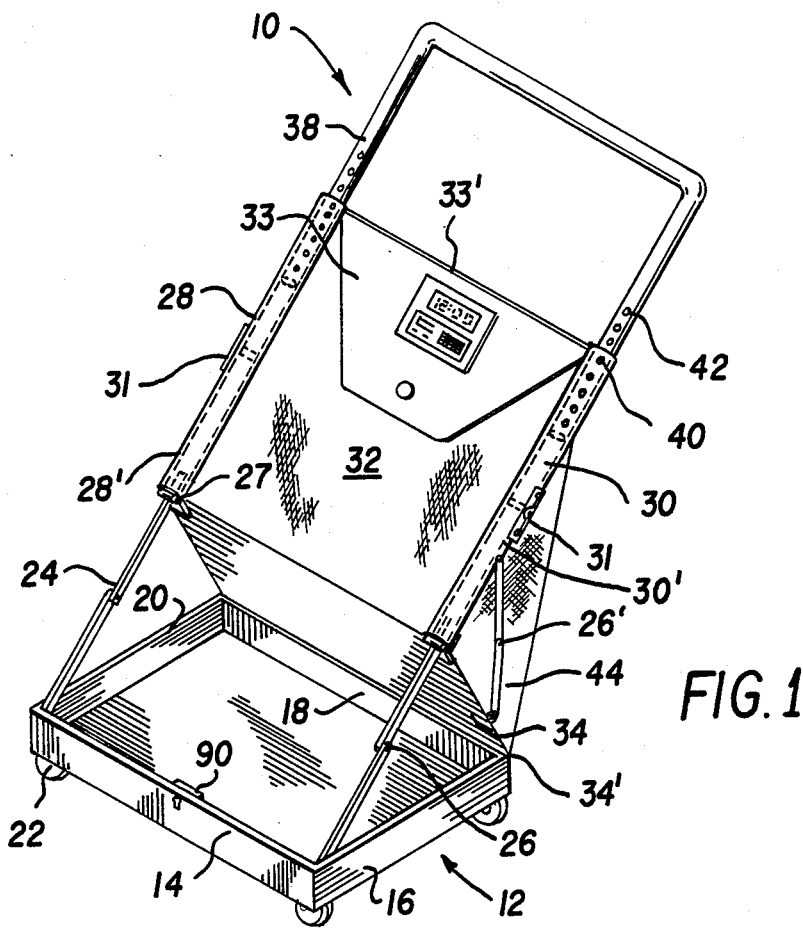
FIG. 1 is a perspective view of the apparatus.

Referring now to the drawings, FIG. 1 illustrates device 10 in which planar base 12 has four vertical end pieces 14, 16,18 and 20 attached thereto. A set of four swivable casters 22 are attached to the bottom surface of planar base 12 and two foldable extension members 24, 26 are rigidly affixed to the interior frontal corners of planar base 12.

Foldable extension members 24, 26 are disposed between the planar base 12 and tubular structural frame members 28,30. Each foldable extension member has two terminal ends, the lower of which is attached to the interior of planar base 12 and the upper terminal of which is respectively attached to the lower end of tubular structural frame members 28, 30.

A planar base assembly cover 34 is pivotably attached to vertical end piece 18 of planar base 12. The planar base assembly cover 34 pivoting on the vertical end piece 18 by any suitable methods such as pliable cloth, as indicated a 'hinge-less hinge' 34'.

Planar base assembly cover 34 is pivotably attached at the back to vertical end member 18 and at the sides to pliable sidepanels 44 and 44' and tangentially to tubular structural frame members 28, 30. Planar base assembly cover 34 is further attached at the front to the lower edge of planar frontal surface 32.

Frontal planar surface 32 is rigidly attached to said tubular structural frame members 28 and 30 on either side thereof, and further said frontal planar surface 32 is rigidly attached to planar base assembly cover 34 at the lower edge thereof.

Sidepanels 44 and 44' being constructed of any suitable pliable material such as nylon, canvas, or flexible plastics and being substantially triangular in shape and configuration so as to attach to both frontal planar surface 32 on one 'leg' of triangular sidepanels 44 and 44' and attach to said planar base assembly cover on the lower 'leg' of said triangular sidepanel 44 and 44'.

As foldable extension members 24, 26 are folded, tubular structural frame members 28 and 30 are thereby lowered, coming into proximate contact with the upper edges of vertical end pieces 14, 16 and 20 respectively. Said lowering motion resulting in planar base assembly cover 34 also coming downward into proximate contact with upper surfaces of vertical end pieces 14, 16 and 20, it being understood that the rear edge of said planar base assembly cover is pivotably attached to the upper edge of vertical end piece 18.

Access to the interior of the apparatus is through panel 33 which has hinging means 33' disposed along the upper edge of front planar surface 32.

Tubular structural frame members 28 and 30 have two terminal ends, the upper of which have holes 40 disposed therein. Handle 38 is slidably disposed within said tubular structural frame members 28 and 30. Handle 38 having holes 42 disposed along two terminal ends that slide into said tubular structural frame member 28 and 30 such that said holes 40 and 42 are proximate one to another with the result that a fastening pin or other device may be inserted therethrough to hold said handle 38 in a given configuration to said tubular structural frame members 28 and 30.

Rear planar surface 45 is a pliable, foldable material and is affixed to tubular frame members 28 and 30 and is also affixed to hinging means 34'. Rear planar surface 45 permits handle frame 28 and 30, in combination with hinging means 31, to fold compactly down on itself.

Hinging means 27' further advances the storage utility of the device, in combination with hinging means such as a double hinge 31, by allowing the base of frame 28', 30' to fold over and lay proximately flat against the base assembly unit. Handle 38 is offset in this position by a comfortable margin to allow the user to grasp the handle in a manner non-interfering with the base assembly unit itself. Hinging means 27 being affixed between base assembly 12 and lower terminal end of structural supports 28 and 30. This plurality of hinging means allows the handle 28,30 to be folded over and to lay substantially flat against base assembly 12 as the apparatus is to be carried.

Figures 2, 3:
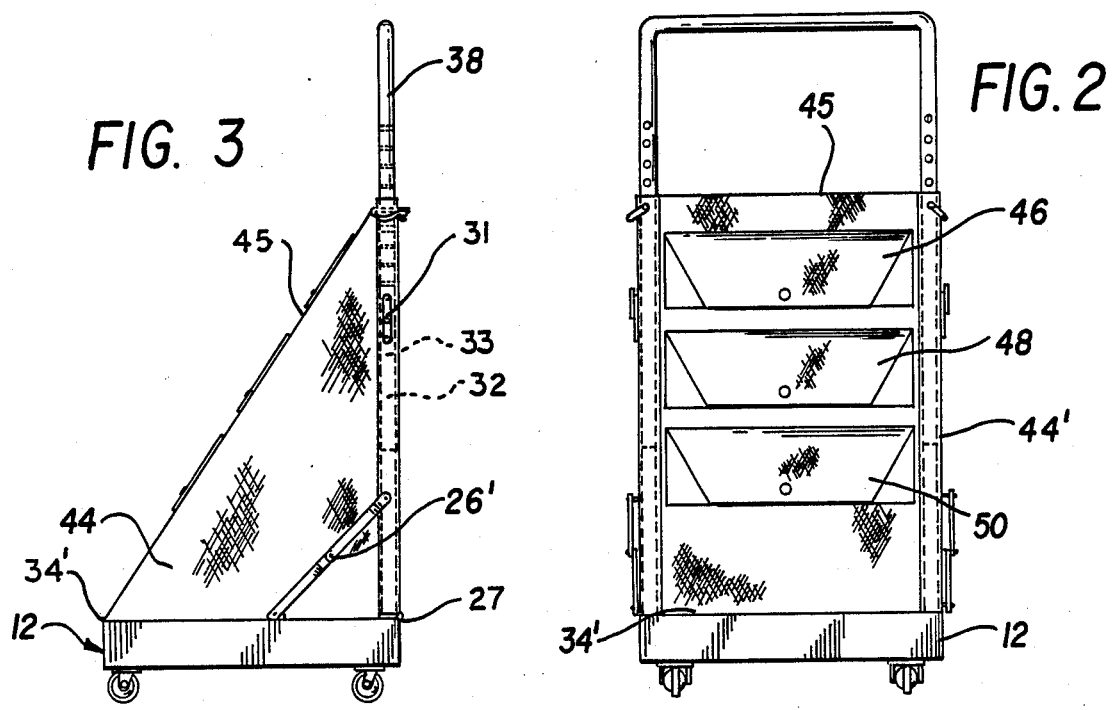
FIG. 2 is a rear view showing the manner in which the sidepanels and interior space dividers act in concert to create a plurality of useable pockets or pouches.
FIG. 3 is a side view illustrating the portable locker in a closed position, that is with the lid down on the base storage assembly.

FIG. 3 is a side view and illustrating the device in its closed position, preparatory to the user tilting it to rest and move on the rear positioned wheels or casters. A latchable fastener 90 is disposed between said planar base assembly 12 and said planar base assembly cover 34 with the result that said assembly 12 be be latched.

Figure 4:
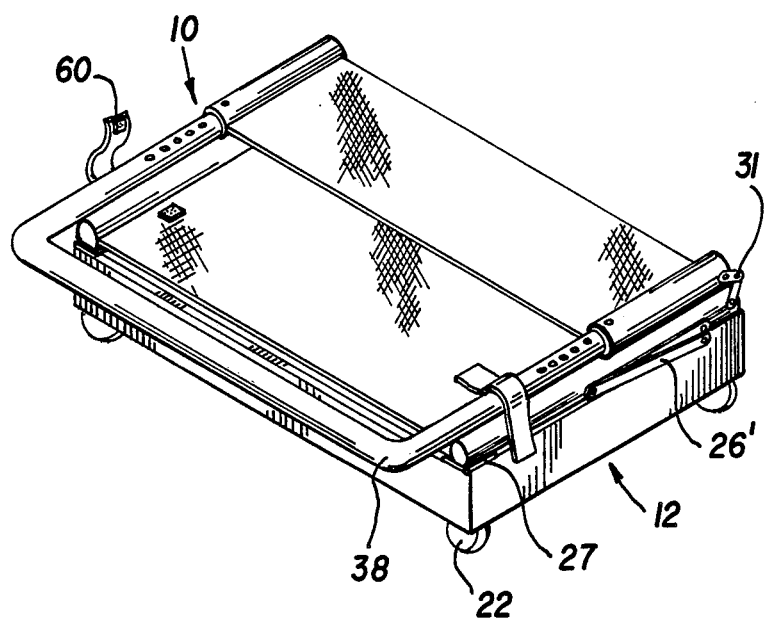
FIG. 4 illustrates the device when folded into a compact apparatus for convenient carrying by the user.

FIG. 4 is a perspective view of the device folded down and ready for carrying. A plurality of straps 60 permit the user to secure the device in the folded position so as to allow it to be carried without unfolding as the apparatus is lifted. Securing means 60 may be straps affixed with a buttonless mode of operation or affixed with any other suitable fastening means.

Rear planar surface 45 has has dividers 46,48 and 50 disposed therein such that these rear mounted pockets or pouches may be snappably opened or closed for the purpose of carrying smaller, individualized items.

What is claimed:

1. A portable storage apparatus, comprising;
   a base assembly forming a first interior compartment;
   roller means fixedly mounted beneath said base assembly;
   a base assembly cover pivotally attached to said base assembly by primary hinge means, said primary hinge means allowing said base assembly cover to be folded onto said base assembly;
   a pair of foldable support members having opposite ends attached to said base assembly and said base assembly cover, said foldable support members adapted to releasably support said base assembly cover in a raised position;
   a front planar surface deployed between a pair of primary foldable structural supports, each of said primary foldable structural supports pivotally attached to said base assembly cover by secondary hinge means;
   said primary foldable structural supports including tertiary hinge means, each of said primary foldable structural supports being foldable upon itself;
   a pair of pliable triangular side panels; each of said pliable side panels attached to and extending between said primary foldable structural supports and said base assembly cover;
   a back planar surface disposed between said pliable triangular side panels;
   a second interior compartment formed by said front planar surface, said pliable said panels, and said back planar surface;
   means for access to said second interior compartment; and
   a handle mounted on said structural supports.

2. A device as recited in claim 1, including;

means for adjusting the position of said handle relative to said primary foldable structural supports.

3. A device as recited in claim 1, including;
a plurality of pockets on said back planar surface for storing items.

4. A device as recited in claim 1, including;
a lockable fastener disposed on said base assembly whereby said base assembly cover may be locked relative to said base assembly.

5. A device as recited in claim 1, wherein:
said means for access to said second interior compartment is disposed on said front planar surface.

* * * * *